United States Patent [19]

Hildebrand et al.

[11] 4,171,551
[45] Oct. 23, 1979

[54] SPRING SUSPENDED STREET SWEEPER HAVING REAR AXLE SPRING LOCKOUT

[75] Inventors: Donald L. Hildebrand, Union; Jack Mitchell, Aurora; Gerald N. Kieft, St. Charles; Ernest F. Prescott, Elgin, all of Ill.

[73] Assignee: Elgin Sweeper Company, Elgin, Ill.

[21] Appl. No.: 940,560

[22] Filed: Sep. 8, 1978

[51] Int. Cl.² .............................................. E01G 1/02
[52] U.S. Cl. ....................................... 15/84; 280/718
[58] Field of Search ....................................... 15/82–87, 15/340; 180/704, 718

[56] References Cited

U.S. PATENT DOCUMENTS

| | | | |
|---|---|---|---|
| 1,416,041 | 5/1922 | Liddell | 15/84 |
| 2,917,761 | 12/1959 | Burgdorff | 15/84 |
| 3,363,274 | 1/1968 | Tamny | 15/84 |
| 3,730,549 | 5/1973 | Turner, Jr. | 280/704 |

*Primary Examiner*—Edward L. Roberts

[57] ABSTRACT

A self-propelled street sweeping machine or sweeper which includes a main frame. A dirt hopper and a main broom are mounted on the frame along with a conveyor. The conveyor is positionable relative to the frame for receiving sweepings from the main broom and for discharging the sweepings into the dirt hopper. Means are provided on the sweeper for enabling the main broom and the conveyor to move selectively of a transport position to a sweeping position and vice versa. The frame is supported by front and rear axles carried on wheels and spring means are provided between the rear axle and the main frame to enable an easier ride while the sweeper is operated in the transport position. Lockout means has been provided between the frame and spring means, and it is only effective to lock out the spring means preventing relative movement between the frame and the rear axle when the conveyor is placed in the sweeping position to receive sweepings but ineffective to inhibit operation of said spring means when the conveyor is moved into the transport position.

15 Claims, 10 Drawing Figures

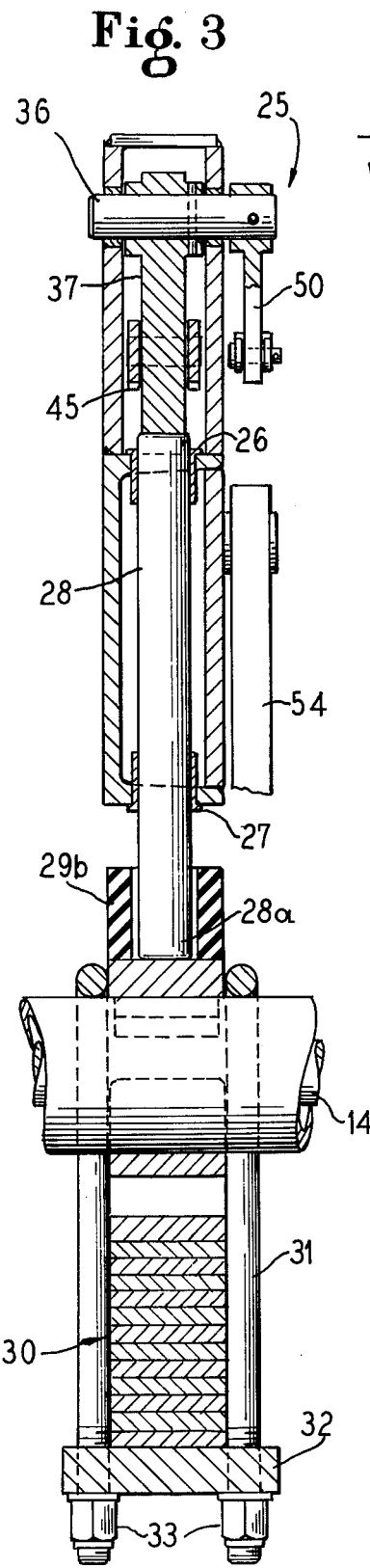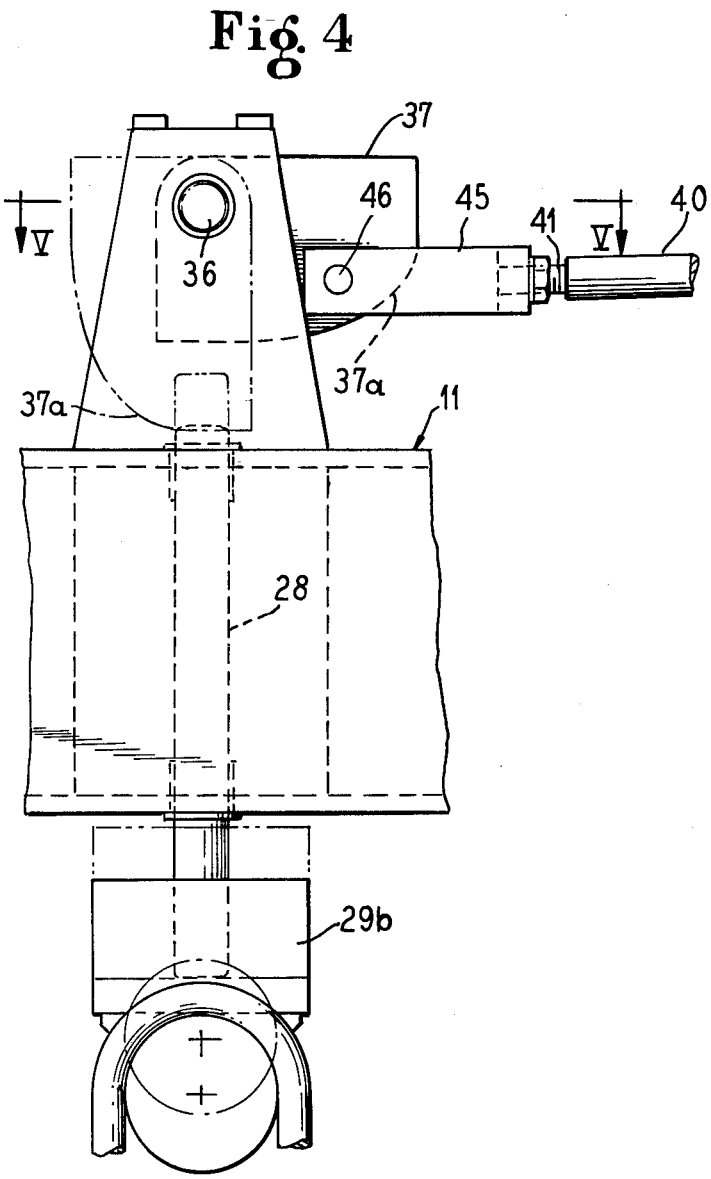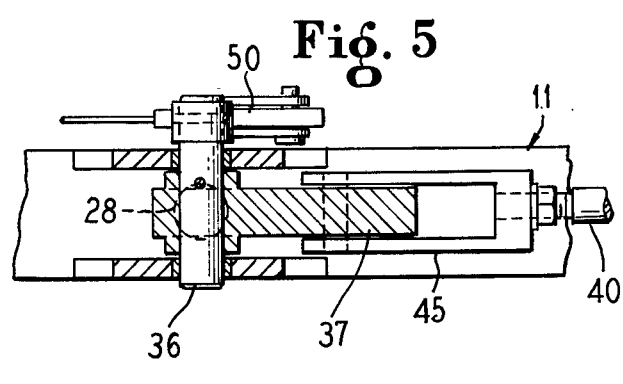

SPRING SUSPENDED STREET SWEEPER HAVING REAR AXLE SPRING LOCKOUT

Street sweeping vehicles which sweep the streets commonly do so at a relatively "slow speed" of under 10 MPH and transport either loaded or empty at a relatively "high speed" of up to 55 MPH legal limit. Such sweeping vehicles have two suspension requirements for idea operation in modes of sweeping and transporting.

Transport Mode. In the mode for transport of a load of sweepings to a dump site, high speed transport of the sweeper from factory to the customer, or high speed transport of the vehicle from one sweeping site to another, it is beneficial to have all road wheels suspended from the vehicle frame on resilient springs. This spring suspension smooths out bumps and irregularities in the road surface which gives the operator a much more comfortable ride. The springs also dampen vibration and road shock that is transmitted from the axles to the vehicle frame thus providing longer lived structural components and mechanical components attached to the sweeping vehicle frame. The springs also provide improved steering.

Sweeping Mode. 1. The main broom suspension (cantilevered arms—spring supported) design was chosen because: (a) A suspension is provided that allows the main broom to be rotated for "transport" so that the overall vehicle length is reduced and the main broom is not cantilevered on the pivots in the "transport" position. (b) A simple suspension linkage is provided that only requires daily or weekly spring adjustment to compensate for bristle wear. (c) The suspension is sufficiently flexible so that the main broom can be maintained in ground contact during rear wheel travel over normal road bumps and depressions.

2. By locking out the rear axle spring, the following advantages occur: (a) Constant main broom pressure (as measured by "broom pattern") can be maintained on the ground. (b) Fixed dimension between street level and belt conveyor cleat can be maintained at the following conditions which tend to alter "a" and "b". (c) As the hopper load increases, the vehicle frame cannot drop down closer to the street due to rear spring action. (d) When the hopper loads unevenly from left to right (a common occurence) the sweeper frame will not drop closer to the street on one side than the other due to the spring with more weight being deflected further than the spring on the lighter side and to create a condition where the main broom ground pressure (pattern) is uneven from left to right and the lower portion of the conveyor is not parallel to the street. (e) When the vehicle passes over bumps the tendency of the vehicle frame to "rebound", and raise the conveyor and main broom, is substantially reduced.

Past Practice on Sweeping Vehicles. Up to now, street sweepers have used one of the following designs in order to obtain satisfactory broom geometry.

Design No. 1: Resilient springs at the rear axle of the sweeper have been omitted. Where the springs are omitted, however, the sweeper gives a rough ride due to the vibrations that are set up when the sweeper is being transported from one point to another at a relatively "high speed".

Design No. 2: Resilient springs have been used between the vehicle frame and rear axle. The main pick-up broom is set on wheels and towed similar to towing a trailer. The tow member is pivotable vertically and partially horizontally which allows the vehicle to go up and down or from side to side while the geometry between the broom and the ground remains constant because the broom is suspended on the unsprung trailer wheels. When in "transport", the vehicle has the use of resilient springs on all vehicle wheels.

The present invention incorporates the nonsprung design of Design No. 1 when sweeping to obtain the geometry and suspension benefits for the main broom and conveyor and, when not sweeping, reverts to a vehicle with springs between the rear wheels and the vehicle frame.

The front wheels may be fully sprung at all times since the front axle is so far forward of the pick-up broom that front wheel and axle movement does not affect the rear axle and main broom-conveyor geometrical relationship.

An important object of this invention is to provide a new and improved street sweeper that can be operated at relatively "slow speeds" while maintaining almost fixed geometry between the main broom, conveyor, and frame, and which can also be operated at relatively "high speeds" while giving the operator a relatively comfortable cushioned ride.

Still another object of this invention is to provide a new and improved street sweeper having a control that can be operated so as to simultaneously move a conveyor for receiving sweepings from a transport position to a sweeping position and lock out the rear axle spring means to insure that almost fixed geometry can be maintained between the conveyor and the frame of the sweeper.

Still another object of this invention is to provide a street sweeper having a single control that can be operated by an operator in a cab at a forward end of the sweeper for moving the conveyor from a transport position to a sweeping position while at the same time locking out the effectiveness of the springs on the rear axle and moving a main pick-up broom from the tranport to a sweeping position.

Other objects and features of this invention will become evident from the following detailed description of the drawings:

FIG. 3 is an enlarged cross sectional view taken substantially on the line III—III looking in the direction indicated by the arrows as seen in FIG. 2;

FIG. 4 is an enlarged fragmentary side elevation of the lockout means which is shown in full and dotted lines illustrating important features of our invention;

FIG. 5 is an enlarged fragmentary cross sectional view taken substantially on the line V—V looking in the direction indicated by the arrows;

Figure 1:
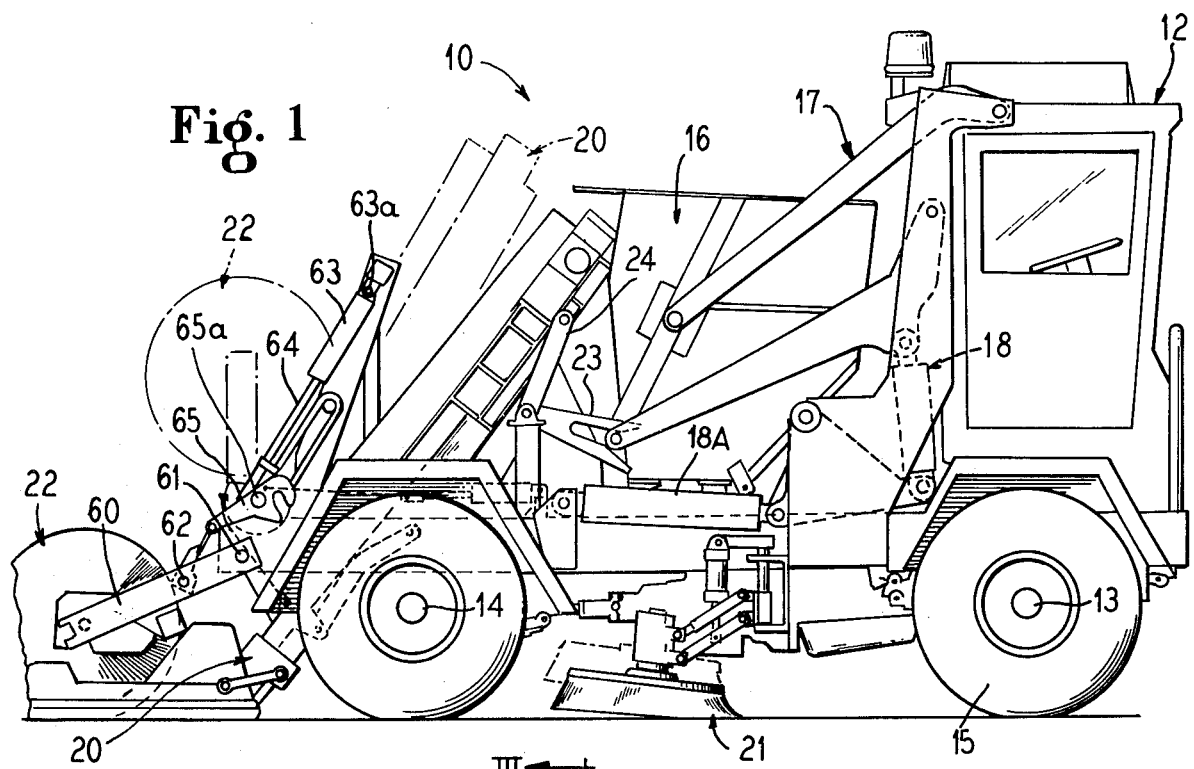
FIG. 1 is a side elevation of a self-propelled street sweeper embodying important features of our invention.

The reference numeral 10 indicates generally a self-propelled street sweeping machine or sweeper. As shown in FIG. 1, the sweeper 10 includes a main frame 11 having a cab 12 mounted at its forward end. Front and rear axles 13 and 14 along with tires 15 are provided for supporting a frame 11. Also mounted upon the frame 11 is a dirt hopper 16. A linkage mechanism 17 is provided for moving the dirt hopper 16 through an arc into a dumping position over the cab. A pair of hydraulic rams 18 and 18a, one on each side, are provided for actuating the linkage 17 to move the dirt hopper 16 from a seated position on the frame 11 into its forward dumping position which relationship is shown in greater detail in a copending U.S. patent application, entitled "Four-Wheeled Sweeper", U.S. Ser. No. 940,598, filed on Sept. 8, 1978 and owned by the same assignee of record.

Mounted rearwardly of the dirt hopper 16 is a conveyor 20. This conveyor is provided for transporting sweepings into the dirt hopper 16. Side brooms 21 and a main broom 22 are further provided for causing sweepings to be deposited on the conveyor 20 for transport to the dirt hopper 16. When the dirt hopper 16 is to be moved to its dumping position, the parallel linkage 17 and the ram 18 coact with conveyor linkage 23 and 24 for pivoting the conveyor rearwardly relative to the frame as shown in the full and dotted line in FIG. 1 so that the dirt hopper 16 and the conveyor can closely coact when sweepings are being conveyed to the dirt hopper and so that they can be separated from one another to enable the dirt hopper to be moved so that its contents can be dumped forward of the cab as previously described.

These relationships are more fully described in connection with the aforesaid copending U.S. patent application.

Figure 7:
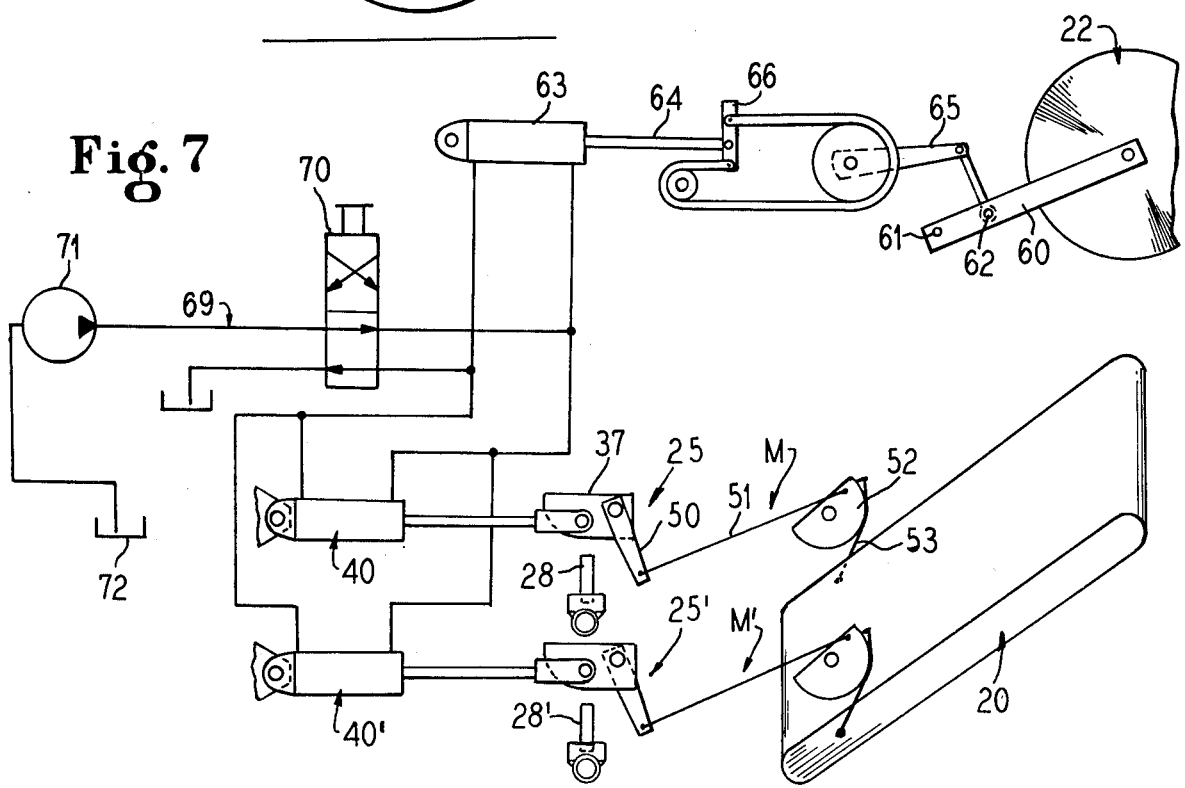
FIG. 7 is a hydraulic circuit diagram showing controls for operating certain of the components of the sweeper shown in FIG. 1 and elsewhere.
Figure 8:
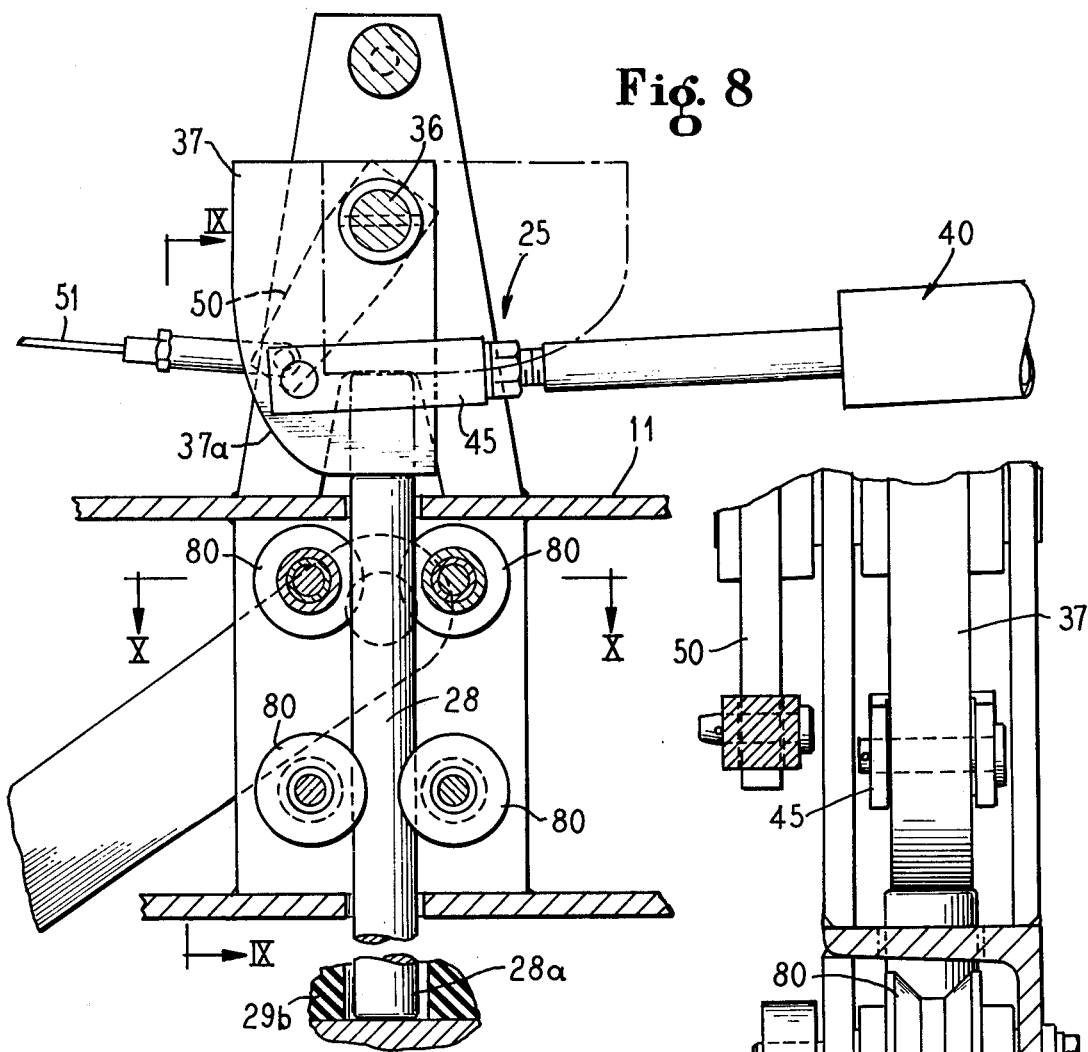
FIG. 8 is an enlarged fragmentary cross sectional view showing a modified mounting for the rear axle lockout.

According to important features of our invention, we have provided a pair of lockout mechanisms or means to lock out relative movement and spring action between the main frame 11 and the rear axle 14 which is indicated generally at 25 and 25' (FIG. 7). Each of the lockout means are identical and a description of one will suffice for both. The lockout means 25 includes spaced bushings 26 and 27 (FIG. 2) which are mounted on the frame 11 and serve as guides for lockout pins 28 and 28' (FIG. 8). The lower end of the lockout pin 28 as indicated at 28a is supported on a pin support plate 29c having a bumper or sleeve 29b formed of elastomeric material and provides a yieldable stop means between the differential housing 29 and the frame 11. The bumper 29b is mounted on and secured to a steel plate 29c and the steel plate 29c is welded to the axle housing 29. The lockout pin 28 is thus free to float up and down relative to the guides 26 and 27 as the sweeper moves at high speeds on the roadway. This up-and-down movement can occur because of a conventional spring action which results as a consequence of the placement of a conventional leaf or coil spring 30 in underlying relation with respect to the rear axle 14. Only one spirng 30 has been illustrated but it will be appreciated that a pair of such springs are provided. As will be seen in FIG. 2, the leaf spring 30 is joined to the differential housing 29 by means of a conventional U-strap 31 which is looped at its top side over the housing and which extends adjacent to the leaf spring and is secured in assembly with the leaf spring by means of a strap plate 32 and strap fasteners 33—33 which are in threaded assembly with opposite ends of the U-shaped strap 31. The opposite ends of the spring are secured to the frame by conventional spring end mountings as indicated generally at 34 and 35. A universal connection 34a and a universal connection 35a can be used at respective forward and rear opposite ends of the springs which is a conventional construction.

The lockout means or mechanism 25 further includes lockout support shaft 36 and a lockout cam or cam plate 37 is mounted thereon. The cam plate 37 has a cam pin engaging surface 37a which is of a rounded configuration for progressive engagement with the pin 28 as the cam plate is rotated on its support axis or shaft 36. Thus, when the cam plate 37 is in the position shown in FIG. 2, any movement of the pin 28 relative to the frame and the spring is inhibited. It is only when the cam plate is in a so-called disengaged position that the pin 28 is free to float and the frame 11 can then move relative to the differential housing 29.

Hydraulic rams 40 and 40' are provided for actuating the lockout mechanisms 25 and 25' (FIG. 7). The ram 40 actuates the cam plate 37 and also causes the conveyor 20 to move from a transport position to a sweeping position as shown in FIG. 1. The transporting position is indicated by the dotted lines in FIG. 1, and the sweeping position is indicated by the full line shown in FIG. 1.

The ram 40 is pivotally mounted at 40a on the frame and has its movable end or piston 41 attached to the cam plate 37 so that the cam plate can rock on its axis or support shaft 37 and thereby be moved into engaged and disengaged positions relative to the lockout in 28. This relationship is shown by the full and dotted lines in FIG. 4. In order to achieve this result, the movable end 41 of the ram is connected to a cam plate link 45. The link 45 is pivotally connected at 46 to the cam plate 37 and it is in this way that the cam plate engaging surface 37a can be moved through an arc of roughly 90 degrees into and out of engagement with the lockout pin 28.

Figure 2:
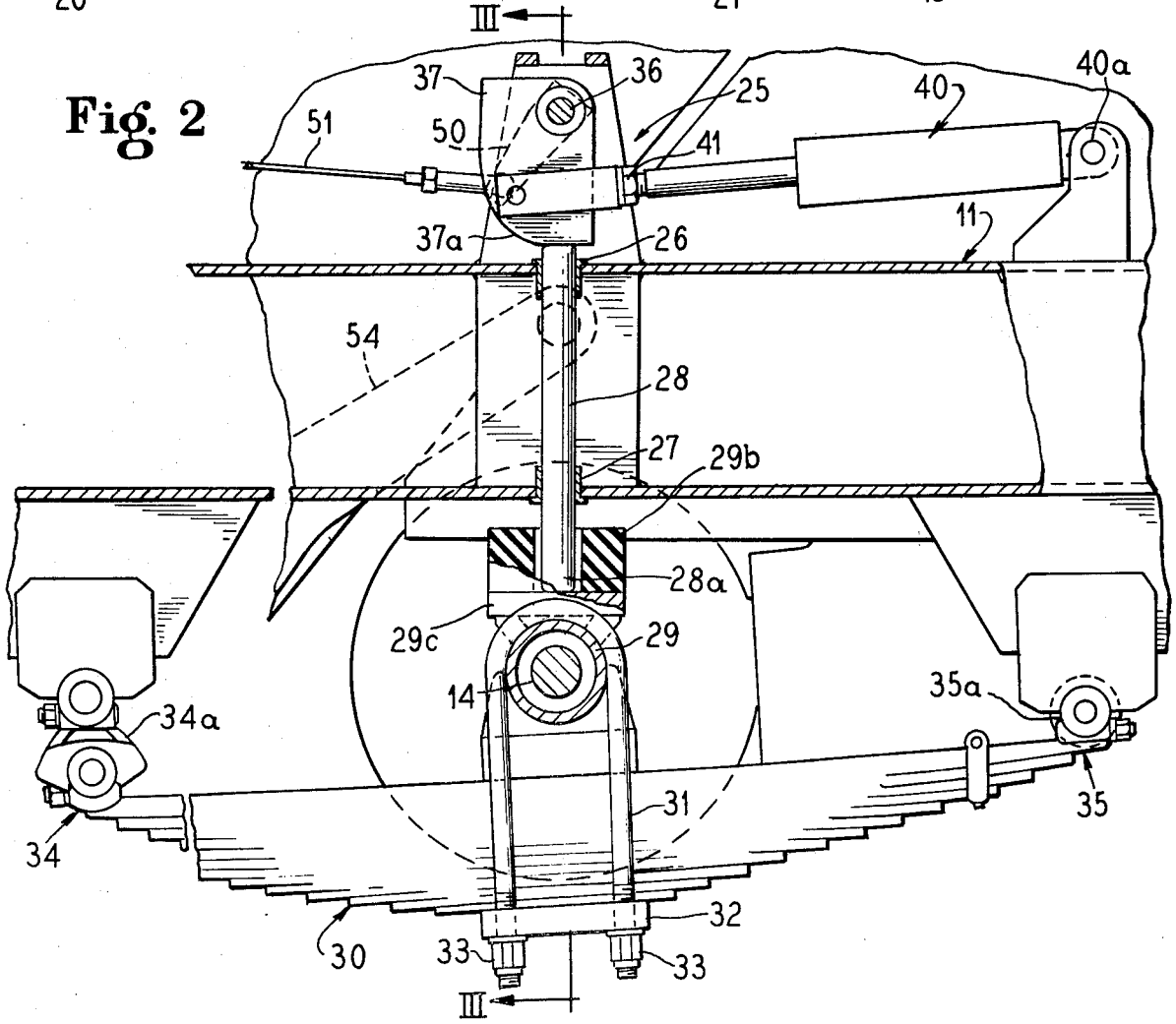
FIG. 2 is an enlarged fragmentary end section as viewed immediately inside of the rear wheel of the street sweeper of FIG. 1.
Figure 6:
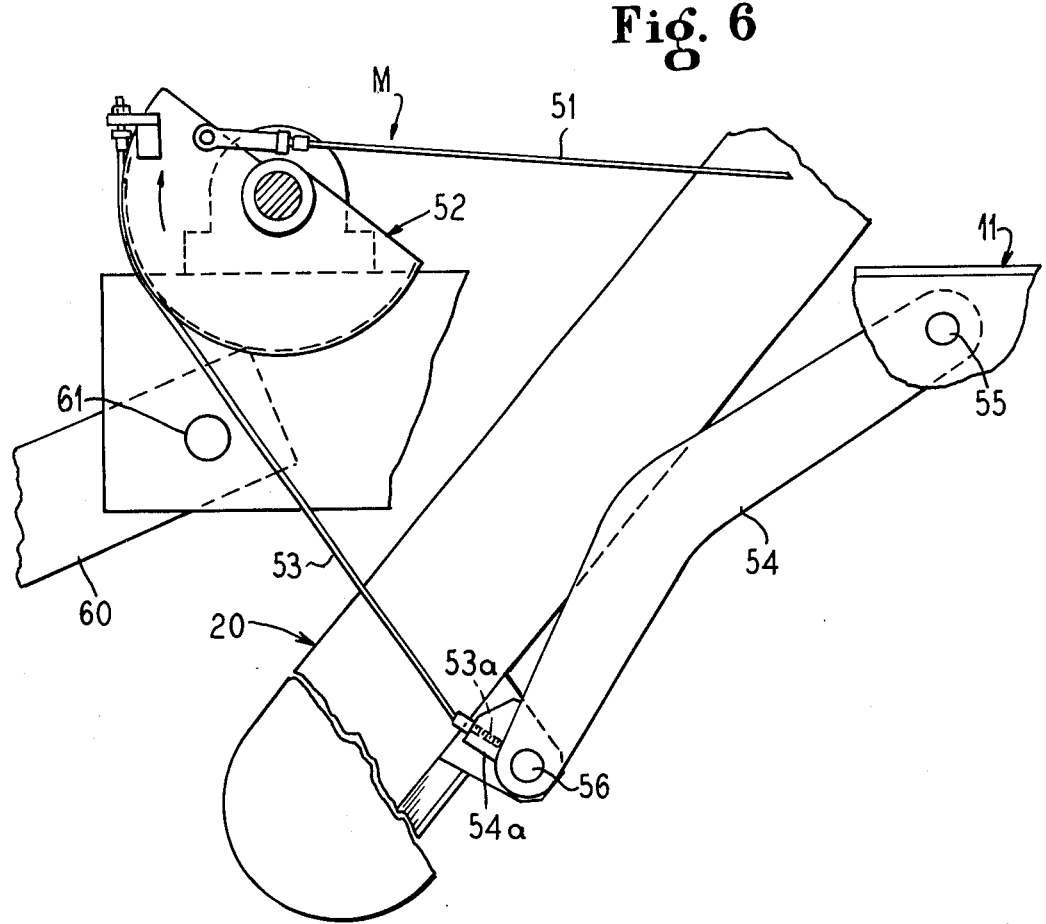
FIG. 6 is an enlarged fragmentary partially sectioned view showing the mechanism for lowering and lifting the conveyor.

It is also significant to note that the ram 40 functions to operate through the cam plate support shaft 36 and means M to move the conveyor 20 from a transport position to a sweeping position, and this means will now be described in further detail. With reference to FIG. 2, it will be there seen that a lever 50 is mounted on the lockout support shaft 36 so that it can be moved relative thereto with the operation of the ram 40. Connected to the lever 50 is a cable 51 which extends rearwardly of the machine to a pulley sector or cable winder 52 (FIG. 6). A second cable 53 extends from the pulley sector or cable winder and has its cable end 53a secured to the pivotal link 54a. A pivotal link 54 is pivotally mounted at 55 on the main frame 11. An opposite end of the lever 54 is pivotally connected at 56 to the conveyor frame 20a. Thus, as ram 40 is actuated, the cable winder 52 is operated to cause the cable 53 to be moved to raise or lower the conveyor 20 as previously described. A second cylinder or ram 40' is provided to coact with means M', and an opposite side of the conveyor to also assist in moving the conveyor from its transport position to its sweeping position (see FIG. 7).

The street sweeper 10 here illustrated is constructed so as to tow the main pick-up broom from left-hand and right-hand towing arms 60 which are each pivoted on the frame at 61. Only one of the towing arms 60 is illustrated since the construction and operation of the main sweeper and the way in which it is mounted upon the sweeper 10 is better illustrated and described in the copending U.S. patent application that was previously identified herein. Both left-hand and right-hand towing arms 60 sustain identical angular movement in traveling from the transport position (raised) to the sweeping position (lowered). This is accomplished by fastening both towing arms 60 to stub shafts 62,62. The rotation of the cross shaft is performed when a hydraulic cylinder 63 which is pivoted on the vehicle frame at one end 63a, and has the cylinder piston rod 64 fastened to a lever 65 rigidly connected to the cross shaft 65a, at the other cylinder end, is extended causing the cross shaft to rotate and lower the towing arms, or, as the cylinder rod is retracted, causing the cross shaft to rotate in the opposite direction and raise the towing arms. A double ended chain 66 provides a convenient way for attaching the rod or piston 64 to the lever 65.

The lowest position of the main broom 22 occurs at the end of the piston rod extension. The arm 60 is suspended on an extension spring (not shown) which is adjustable so that proper broom pattern on the ground can be maintained as the main broom fibers wear and become shorter.

The same oil supply and pressure that is used to actuate the above cylinder 63 is also directed to another right-hand cylinder and a left-hand cylinder 40 and 40' which extend and retract with the main pick-up broom raising and lowering cylinder. These two cylinders (left-hand and right-hand) 40 and 40' (FIG. 7) are pivoted on the vehicle frame at one end and have their piston rod end connected to a combination cam and lever plate 37 which is fastened to the shaft 36 (FIG. 2). The shaft is pivoted in bushings secured in a plate which is rigidly fastened to the vehicle frame. At the opposite end of this shaft, another lever is fastened to which is connected a multiple strand cable which is routed over a pulley and connected to a lower end of a belt conveyor frame. Immediately under the cam and lever plate is a vertically positioned spring lockout pin 28 which is guided vertically in bushings or bushings 26 and 27 and rollers fixed to the vehicle frame. The bottom end of the pin 28 rests on the steel base plate 29c fixed to the vehicle rear axle housing 29. As the cylinder rod extends on each side, two things happen simultaneously.

1. The cam plate 37 rotates and the cam face 37a contacts the top of the spring lockout pin 28 which results in raising the vehicle frame vertically with respect to the vehicle axle. With the weight of the vehicle frame on top of the pin (through the cam) and the bottom of the pin against the steel plate at 29c, no vertical movement on the rear axle can now occur due to the flexing of the rear springs which connect the rear axle to the vehicle frame.

2. As the cam plate 37 rotates, the shaft 36 and lever 50 attached to the cam plate rotates. As the lever 50 rotates, the cable 51 attached to the lever moves and changes direction as it passes partially around a pulley 52. The lower end of the cable 53a is fastened to the pivotal link 54 at 54a (FIG. 6). As the cable travels outward, the weight of the conveyor frame assembly allows the lower end of the conveyor to drop down until it reaches a fixed sweeping position when the conveyor rests on a lower stop. The conveyor frame is pivoted at a single right-hand and left-hand point in the upper part of the conveyor frame. The frame is at an acute angle with the sweeping surface. The cable length is adjustable so that the conveyor frame stop can be set at the optimum location for optimum conveyor position for sweeping.

The above dual actuation caused by a single right-hand and left-hand cylinder results in the automatic lockout of the rear springs of the vehicle when the conveyor and main broom are lowered for sweeping. It results in the automatic return to a spring suspension condition of the rear axle when the main broom and conveyor are raised prior to transport of the vehicle to another sweeping area or a dump site.

With respect to hydraulic circuit 69 shown in FIG. 7, it will be noted that a single valve 70 located in the cab serves to actuate the main broom lift and the conveyor lift all as previously described. The circuit shown in FIG. 7 includes a variable pump having a fixed stroke as noted at 71. This pump is connected at a reservoir at 72. The pump may be connected to a cooler (not shown) if desired. The various fluid lines shown in the hydraulic circuit are linked to cylinders 40,40' and 63 on opposite sides of the pistons which are not shown.

Figure 9:
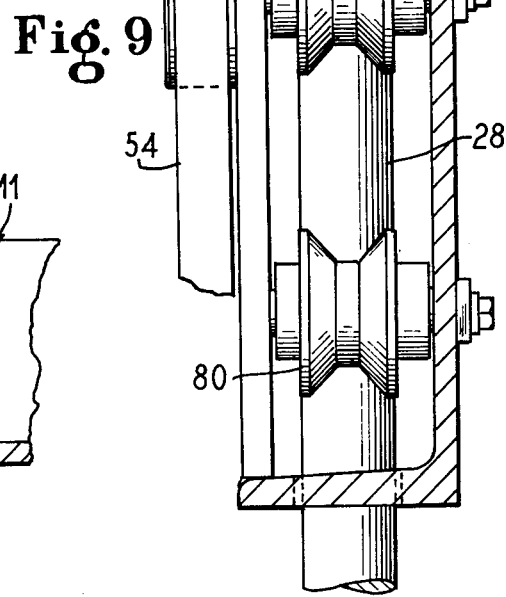
FIG. 9 is an enlarged fragmentary cross sectional view taken substantially on the line IX—IX looking in the direction indicated by the arrows as seen in FIG. 8.
Figure 10:
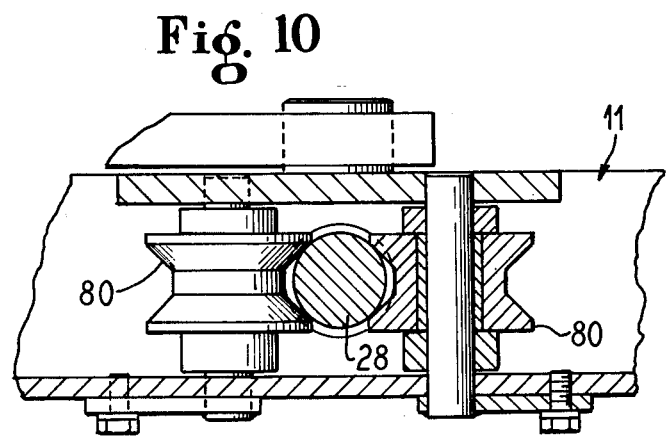
FIG. 10 is an enlarged fragmentary cross sectional view taken substantially on the line X—X looking in the direction indicated by the arrows as seen on FIG. 8.

FIGS. 8, 9 and 10 show a modification where the common elements that have already been described have been identified by the same reference numerals as before. The main difference between the structure shown in FIG. 8 as compared to that previously described in FIG. 2 concerns the mounting for the lockout pin 28. In this connection, sets of rollers 80—80 are mounted on the frame with one set being superimposed above another set and with the lockout shaft 28 being movable up and down relative to the rollers as shown in FIG. 10. The mounting shown here for the lockout pin 28 is prepared over the one previously illustrated and described.

We claim as our invention:

1. A self-propelled street sweeping machine including a main frame, a dirt hopper and a main broom mounted on the frame, a conveyor positionable relative to the frame for receiving sweepings from the main broom and for discharging the sweepings into the dirt hopper, means for enabling the conveyor to move selectively from a transport position to a sweeping position and vice versa, front and rear axles, wheels on the axles, spring means between the rear axle and the main frame, and lockout means only effective between said frame and said spring means to lock out said spring means preventing relative movement between the frame and the rear axle when said conveyor is placed in said sweeping position but ineffective to inhibit operation of said spring means when said conveyor is moved into said transport position.

2. The sweeping machine of claim 1 further characterized by said lockout means including a lockout cam pivotally mounted on said frame, guide means on the frame overlying the rear axle, a lockout pin operatively guided by said guide means and having a lower end operatively connected to said rear axle and an upper end engageable by said lockout cam, cam actuating linkage connected to said lockout cam, and a ram connected to said cam actuating linkage to rigidly lock out movement of said lockout pin when in said sweeping position.

3. The sweeping machine of claim 2 further including conveyor lifting and lowering means mechanically connected to said lockout cam at one end and to said conveyor at an opposite end to move said conveyor from a transport position to a sweeping position upon actuation of said ram.

4. The sweeping machine of claim 2 further characterized by including hydraulic circuit means connected to said ram for effecting lockout, and conveyor lifting and lowering means mechanically connected to said lockout cam at one end and to said conveyor at an opposite end to move said conveyor from a transport position to a sweeping position upon actuation of said ram.

5. A self-propelled street sweeper including a main frame, a dirt hopper and a main broom mounted on the main frame at its rear end, a pair of towing arms connecting opposite ends of said main broom with said main frame, a conveyor positionable relative to the frame for receiving sweepings from the main broom and for discharging the sweepings into the dirt hopper, first means for enabling the conveyor to move selectively from a transport position to a sweeping position immediately forward of said main broom and vice versa, second means for moving said main broom from said transport position to said sweeping position, front and rear axles, wheels on the axles, spring means between the rear axle and the main frame, and lockout means only effective between said frame and said spring means to lock out said spring means preventing relative movement between the frame and the rear axle when said conveyor is placed in said sweeping position but ineffective to inhibit operation of said spring means when said conveyor is moved into said transport position.

6. The sweeping machine of claim 5 further characterized by said lockout means including a lockout cam pivotally mounted on said frame, guide means on the frame overlying the rear axle, a lockout pin operatively guided by said guide means and having a lower end operatively supported by said rear axle and an upper end engageable by said lockout cam, cam actuating linkage connected to said lockout cam, and a ram connected to said cam actuating linkage to rigidly lock out movement of said lockout pin when in said sweeping position.

7. The sweeping machine of claim 6 further including conveyor lifting and lowering means mechanically connected to said lockout cam at one end and to said conveyor at an opposite end to move said conveyor from a transport position to a sweeping position upon actuation of said ram.

8. The sweeping machine of claim 6 further characterized by said guide means comprising vertically spaced bushings and with said lockout pin being slidably mounted therein.

9. The sweeping machine of claim 6 further characterized by said guide means comprising vertically spaced pairs of rollers mounted on said frame and with said lockout pin being slidably mounted and movable relative to each pair of rollers.

10. The sweeping machine of claim 6 further characterized by said guide means being cup-shaped and being comprised in part by a sleeve of elastomeric material and with a metallic plate underlying said sleeve and supporting said lockout pin on said rear axle.

11. The sweeper of claim 5 further characterized by said spring means comprising a pair of springs mounted transversely relative to one another, each spring being connected at opposite ends to the frame and centrally connected to said rear axle, said lockout means including a pair of pins, guide means for each of said pins maintaining a lower end of each pin operably connected to the rear axle, lockout cams associated with each of said pins, the upper end of each pin being engageable with one of said lockout cams, and rams connected to said cams to lockout said spring means preventing relative movement between the frame and rear axle when said conveyor is placed in said sweeping position.

12. A self-propelled street sweeper operable in sweeping and transport positions including a frame and a cab mounted at a forward end thereof, a dirt hopper and a main broom also mounted on the frame, a conveyor positionable relative to the frame for receiving sweepings from the main broom and for discharging the sweepings into the dirt hopper, means for moving said dirt hopper over said cab and for dumping the same, means for enabling the main broom and the conveyor to move selectively from said transport position to said sweeping position and vice versa, front and rear axles, wheels on the axles, spring means between the rear axle and the main frame, and lockout means only effective between said frame and said spring means to lock out said spring means when said sweeper is being operated in said sweeping position but ineffective to inhibit operation of said spring means when said sweeper is being operated in said transport position.

13. The sweeper of claim 12 further characterized by said means for enabling the main broom and the conveyor to move selectively from said transport position to a sweeping position including a hydraulic circuit operable through a single control for effecting operation.

14. A self-propelled street sweeper operable in a sweeping position at a relatively low speed and operable in a transport position at relatively high speeds including a main frame having a cab mounted thereon, a main broom dragged behind said main frame at its rear end, parallel arms pivotally mounting opposite ends of the main broom on the main frame, linkage means for permitting movement of the main broom from its transport position to its sweeping position, a conveyor on the main frame forward of the main broom for receiving sweepings from the main broom, a rear axle underlying the main frame, spring means between the rear axle and the main frame, lockout means between the rear axle and the frame, ram means for operating said lockout means and said linkage means and a single control in said cab for operating said ram means to actuate said lockout means and to render the spring means inoperable when the main broom is in its sweeping position to fix the geometry of the parallel arms and the main broom relative to the frame.

15. The sweeper of claim 14 further including a hydraulic circuit operable by said single control for operating said ram means and said lockout means, and ram means connected in said hydraulic circuit operable by said single control for moving said main broom from said sweeping position to said transport position.

* * * * *